US009315739B2

(12) United States Patent
Smith et al.

(10) Patent No.: US 9,315,739 B2
(45) Date of Patent: Apr. 19, 2016

(54) PROCESS FOR UPGRADING BIOMASS DERIVED PRODUCTS

(75) Inventors: Ed Smith, Houston, TX (US); Vicente Sanchez, Houston, TX (US); Jeffrey C. Trewella, Kennett Square, PA (US); Stephen J. McGovern, Mantua, NJ (US); Royce Roemisch, Houston, TX (US); Jennifer Sorrells, Houston, TX (US); Leslie May, Houston, TX (US); Maria Magdalena Ramirez Corredores, Houston, TX (US); Rocio Maria Banda, Houston, TX (US); Lorerz Bauer, Pasadena, TX (US)

(73) Assignee: KiOR, LLC, Pasadena, TX (US)

( * ) Notice: Subject to any disclaimer, the term of this patent is extended or adjusted under 35 U.S.C. 154(b) by 580 days.

(21) Appl. No.: 13/212,861

(22) Filed: Aug. 18, 2011

(65) Prior Publication Data

US 2013/0043192 A1 Feb. 21, 2013

(51) Int. Cl.
| | |
|---|---|
| *B01D 17/02* | (2006.01) |
| *B01D 17/04* | (2006.01) |
| *C10G 29/06* | (2006.01) |
| *C10G 29/10* | (2006.01) |
| *C10G 29/20* | (2006.01) |
| *C10G 29/22* | (2006.01) |
| *C10G 3/00* | (2006.01) |
| *B01D 17/06* | (2006.01) |
| *C10G 32/02* | (2006.01) |
| *C10G 33/02* | (2006.01) |
| *C10G 33/04* | (2006.01) |

(52) U.S. Cl.
CPC ............... *C10G 29/06* (2013.01); *B01D 17/02* (2013.01); *B01D 17/0208* (2013.01); *B01D 17/04* (2013.01); *B01D 17/042* (2013.01); *B01D 17/044* (2013.01); *B01D 17/047* (2013.01); *B01D 17/048* (2013.01); *B01D 17/06* (2013.01); *C10G 3/40* (2013.01); *C10G 3/42* (2013.01); *C10G 29/10* (2013.01); *C10G 29/20* (2013.01); *C10G 29/22* (2013.01); *C10G 32/02* (2013.01); *C10G 33/02* (2013.01); *C10G 33/04* (2013.01); *C10G 2300/1011* (2013.01); *C10G 2300/208* (2013.01); *C10G 2300/308* (2013.01); *Y02P 30/20* (2015.11)

(58) Field of Classification Search
CPC .... B01D 12/00; B01D 17/02; B01D 17/0208; B01D 17/04; B01D 21/00; B01D 2011/0245; B01D 12/02; B01D 17/024; B01D 17/042; B01D 17/044; B01D 17/047; B01D 11/04; B01D 11/0488; B01D 11/0492; C10G 3/40; C10G 3/42; C10G 29/06; C10G 29/10; C10G 29/20; C10G 29/22; C10G 2300/1011; C10G 2300/308; C10G 1/00; C10G 1/04; C10G 1/06; C10G 1/08; C10G 1/083; C02F 2001/007; C07C 1/20; C07C 7/005; C07C 7/001; C07C 7/00; C07C 7/10; C07C 7/20; C10L 1/18; C10L 1/1802; C10L 1/182
USPC ......... 210/639, 708, 749, 770, 773, 774, 800, 210/804; 44/307, 605, 606; 435/135, 435/161–165; 585/240, 242
See application file for complete search history.

(56) References Cited

U.S. PATENT DOCUMENTS

| | | | |
|---|---|---|---|
| 4,147,593 A | 4/1979 | Frischmuth et al. | |
| 4,209,647 A | 6/1980 | Gallivan et al. | |
| 4,222,845 A | 9/1980 | Schmid | |
| 4,299,690 A | 11/1981 | Allan | |
| 4,304,649 A | 12/1981 | Han et al. | |
| 4,396,487 A * | 8/1983 | Strumskis | ..................... 585/242 |
| 4,405,448 A | 9/1983 | Googin et al. | |
| 4,512,239 A | 4/1985 | Watanabe et al. | |
| 4,551,239 A | 11/1985 | Merchant et al. | |
| 4,645,585 A | 2/1987 | White | |
| 4,723,963 A | 2/1988 | Taylor | |
| 4,795,841 A | 1/1989 | Elliot et al. | |
| 4,942,269 A | 7/1990 | Chum et al. | |
| 4,960,507 A | 10/1990 | Evans et al. | |
| 5,104,545 A | 4/1992 | Means et al. | |
| 5,223,601 A | 6/1993 | Chum et al. | |
| 5,395,455 A | 3/1995 | Scott et al. | |
| 5,792,340 A | 8/1998 | Freel et al. | |
| 5,820,640 A | 10/1998 | Ikura et al. | |
| 5,877,380 A | 3/1999 | Conroy et al. | |
| 5,882,506 A | 3/1999 | Ohsol et al. | |
| 5,922,206 A | 7/1999 | Darlington, Jr. et al. | |
| 6,007,702 A | 12/1999 | Schievelbein | |

(Continued)

FOREIGN PATENT DOCUMENTS

| | | |
|---|---|---|
| CN | 101144025 A | 3/2008 |
| CN | 101875846 | 11/2010 |

(Continued)

OTHER PUBLICATIONS

PCT/US2012/050561—WO/2013/025600—International Search Report and Written Opinion, dated Jan. 2, 2013, 13 pages.

(Continued)

*Primary Examiner* — Joseph Drodge

(74) *Attorney, Agent, or Firm* — Dunlap Codding, P.C.

(57) ABSTRACT

Disclosed is a process for the alteration of the ratio of the specific gravities of the oil and water phases resulting from the conversion of biomass to liquid products, the reduction of the conductivity and of metals of the product mixture, which each can aid in the removal of solids contained in the oil phase.

91 Claims, No Drawings

(56) References Cited

U.S. PATENT DOCUMENTS

| | | |
|---|---|---|
| 6,172,272 B1 | 1/2001 | Shabtai et al. |
| 6,602,404 B2 | 8/2003 | Walsh et al. |
| 6,814,940 B1 | 11/2004 | Hiltunen et al. |
| 6,830,597 B1 | 12/2004 | Green |
| 7,004,999 B2 | 2/2006 | Johnson et al. |
| 7,262,331 B2 | 8/2007 | van de Beld et al. |
| 7,279,018 B2 | 10/2007 | Jakkula et al. |
| 7,300,568 B2 | 11/2007 | Ketley et al. |
| 7,311,739 B2 | 12/2007 | Bongart et al. |
| 7,319,168 B2 | 1/2008 | Sanada |
| 7,425,657 B1 | 9/2008 | Elliott et al. |
| 7,501,054 B2 | 3/2009 | Galiasso |
| 7,501,374 B2 | 3/2009 | Galiasso |
| 7,578,927 B2 | 8/2009 | Marker et al. |
| 7,638,314 B2 | 12/2009 | Zappi et al. |
| 7,781,191 B2* | 8/2010 | Dunson et al. .................. 435/99 |
| 7,816,570 B2 | 10/2010 | Roberts, IV et al. |
| 7,819,930 B2 | 10/2010 | Adams et al. |
| 7,861,696 B2 | 1/2011 | Lund |
| 7,883,882 B2* | 2/2011 | Franklin et al. ............... 435/196 |
| 7,888,540 B2 | 2/2011 | Deluga et al. |
| 7,892,300 B2 | 2/2011 | Galiasso |
| 8,075,642 B2 | 12/2011 | Dumesic et al. |
| 8,083,900 B2 | 12/2011 | Lin |
| 8,097,172 B2 | 1/2012 | Islam et al. |
| 8,101,808 B2* | 1/2012 | Evanko et al. ................. 568/916 |
| 8,158,842 B2 | 4/2012 | McCall |
| 8,202,332 B2 | 6/2012 | Agblevor |
| 8,236,173 B2 | 8/2012 | Bartek et al. |
| 8,236,977 B2* | 8/2012 | Woods et al. ..................... 554/8 |
| 8,329,967 B2 | 12/2012 | Brandvold et al. |
| 8,329,969 B2 | 12/2012 | McCall et al. |
| 8,377,152 B2 | 2/2013 | Ramirez Corredores et al. |
| 8,454,712 B2 | 6/2013 | Ramirez Corredores et al. |
| 8,506,658 B2 | 8/2013 | Corredores et al. |
| 8,519,203 B2 | 8/2013 | Marinangeli et al. |
| 8,545,581 B2 | 10/2013 | Agblevor |
| 8,598,378 B2 | 12/2013 | Cooney et al. |
| 8,628,589 B2 | 1/2014 | Ramirez Corredores et al. |
| 8,669,405 B2 | 3/2014 | Ramirez Corredores et al. |
| 8,853,484 B2 | 10/2014 | Ramirez Corredores et al. |
| 8,979,955 B2 | 3/2015 | Agblevor et al. |
| 2003/0115792 A1 | 6/2003 | Shabtai et al. |
| 2003/0207407 A1 | 11/2003 | Buchanan et al. |
| 2004/0055209 A1 | 3/2004 | Jakkula et al. |
| 2004/0111955 A1 | 6/2004 | Mullay et al. |
| 2006/0041152 A1* | 2/2006 | Cantrell et al. ..................... 554/8 |
| 2006/0070912 A1* | 4/2006 | Khan ............................... 208/13 |
| 2007/0007188 A1 | 1/2007 | Skrypski-Mantele et al. |
| 2007/0161095 A1* | 7/2007 | Gurin .............................. 435/134 |
| 2007/0260102 A1 | 11/2007 | Duarte Santiago et al. |
| 2007/0261296 A1 | 11/2007 | Adams et al. |
| 2008/0006520 A1 | 1/2008 | Badger et al. |
| 2008/0050795 A1 | 2/2008 | Mansson et al. |
| 2008/0172931 A1 | 7/2008 | Bazzani et al. |
| 2008/0217211 A1* | 9/2008 | Chornet et al. ............... 208/106 |
| 2008/0264771 A1 | 10/2008 | Dam-Johansen et al. |
| 2008/0300434 A1 | 12/2008 | Cortright et al. |
| 2008/0312476 A1 | 12/2008 | McCall |
| 2009/0000185 A1 | 1/2009 | Aulich et al. |
| 2009/0007484 A1 | 1/2009 | Smith |
| 2009/0054711 A1 | 2/2009 | Lawrence et al. |
| 2009/0065378 A1 | 3/2009 | Maas |
| 2009/0119979 A1 | 5/2009 | Mullen |
| 2009/0124839 A1 | 5/2009 | Dumesic et al. |
| 2009/0139851 A1 | 6/2009 | Freel |
| 2009/0151233 A1 | 6/2009 | Miller |
| 2009/0165378 A1 | 7/2009 | Agblevor |
| 2009/0166256 A1 | 7/2009 | Lewis et al. |
| 2009/0182064 A1* | 7/2009 | Griffin ........................... 518/711 |
| 2009/0182199 A1 | 7/2009 | Rudischhauser et al. |
| 2009/0227823 A1 | 9/2009 | Huber et al. |
| 2009/0229173 A1 | 9/2009 | Gosling |
| 2009/0234030 A1 | 9/2009 | Gouman et al. |
| 2009/0234146 A1 | 9/2009 | Cooney et al. |
| 2009/0250376 A1 | 10/2009 | Brandvold et al. |
| 2009/0253947 A1 | 10/2009 | Brandvold et al. |
| 2009/0253948 A1 | 10/2009 | McCall et al. |
| 2009/0259082 A1 | 10/2009 | Deluga et al. |
| 2009/0294324 A1 | 12/2009 | Brandvold et al. |
| 2009/0301930 A1 | 12/2009 | Brandvold et al. |
| 2009/0318737 A1 | 12/2009 | Luebke |
| 2010/0002792 A1 | 1/2010 | Seyedi-Esfahani |
| 2010/0064574 A1 | 3/2010 | de Almeida et al. |
| 2010/0076238 A1 | 3/2010 | Brandvold et al. |
| 2010/0083566 A1 | 4/2010 | Fredriksen et al. |
| 2010/0105970 A1* | 4/2010 | Yanik et al. .................... 585/240 |
| 2010/0162625 A1 | 7/2010 | Mills |
| 2010/0212215 A1 | 8/2010 | Agblevor |
| 2010/0218417 A1 | 9/2010 | Bauldreay et al. |
| 2010/0256428 A1 | 10/2010 | Marker et al. |
| 2011/0003218 A1 | 1/2011 | Stolte et al. |
| 2011/0068049 A1 | 3/2011 | Garcia, III et al. |
| 2011/0083998 A1 | 4/2011 | Hamper et al. |
| 2011/0126449 A1 | 6/2011 | Xu et al. |
| 2011/0138681 A1 | 6/2011 | Ramirez Corredores et al. |
| 2011/0139262 A1 | 6/2011 | Aburto Anell et al. |
| 2011/0139602 A1 | 6/2011 | Lin et al. |
| 2011/0146140 A1 | 6/2011 | Brandvold et al. |
| 2011/0155631 A1 | 6/2011 | Knuuttila et al. |
| 2011/0192072 A1* | 8/2011 | Steele et al. ..................... 44/307 |
| 2011/0245489 A1 | 10/2011 | Steele et al. |
| 2011/0259793 A1 | 10/2011 | Umansky et al. |
| 2011/0282118 A1 | 11/2011 | Shih |
| 2012/0000821 A1* | 1/2012 | Yang et al. ..................... 208/121 |
| 2012/0005949 A1 | 1/2012 | Stevens et al. |
| 2012/0101317 A1 | 4/2012 | Knight et al. |
| 2012/0101318 A1 | 4/2012 | Ramirez Corredores et al. |
| 2012/0144730 A1 | 6/2012 | Stamires et al. |
| 2012/0151827 A1* | 6/2012 | Powell et al. .................... 44/307 |
| 2012/0172643 A1 | 7/2012 | Ramirez Corredores et al. |
| 2012/0190872 A1 | 7/2012 | Cranford et al. |
| 2012/0204479 A1 | 8/2012 | Ramirez Corredores et al. |
| 2012/0204481 A1 | 8/2012 | Corredores et al. |
| 2012/0216448 A1 | 8/2012 | Ramirez Corredores et al. |
| 2012/0289440 A1* | 11/2012 | Pollard et al. .................. 508/110 |
| 2013/0004646 A1* | 1/2013 | Franklin et al. ............... 426/607 |
| 2013/0014431 A1 | 1/2013 | Jin et al. |
| 2013/0035502 A1* | 2/2013 | Cohen et al. ................... 560/129 |
| 2013/0140216 A1* | 6/2013 | Wickes et al. ................. 208/188 |
| 2013/0144089 A1 | 6/2013 | Fjare et al. |
| 2013/0174476 A1 | 7/2013 | Ramirez Corredores et al. |
| 2013/0326936 A1 | 12/2013 | Ramirez-Corredores et al. |
| 2014/0256965 A1 | 9/2014 | Asikkala et al. |
| 2014/0261715 A1 | 9/2014 | Abhari et al. |
| 2014/0288338 A1 | 9/2014 | Radlein et al. |

FOREIGN PATENT DOCUMENTS

| | | |
|---|---|---|
| EP | 0293069 | 6/1991 |
| EP | 0513051 | 12/1994 |
| EP | 0718392 | 9/1999 |
| EP | 0718392 B1 | 9/1999 |
| EP | 1452579 | 9/2004 |
| EP | 1719811 | 11/2006 |
| EP | 2105456 | 9/2009 |
| EP | 2107100 | 10/2009 |
| EP | 2236584 | 10/2010 |
| GB | 2399571 | 9/2004 |
| KR | 10/0857247 | 9/2008 |
| WO | WO/00/71494 A1 | 11/2000 |
| WO | WO/01/07537 | 2/2001 |
| WO | WO 2006/037368 | 4/2006 |
| WO | WO 2007/128798 | 11/2007 |
| WO | WO 2007/128800 | 11/2007 |
| WO | WO 2008/020167 | 2/2008 |
| WO | WO 2009/014859 | 1/2009 |
| WO | WO 2009/071495 | 6/2009 |
| WO | WO 2009/082366 | 7/2009 |
| WO | WO 2009/111026 | 9/2009 |
| WO | WO/2009/115888 A1 | 9/2009 |
| WO | WO 2009/126508 | 10/2009 |
| WO | WO/2009/130392 A1 | 10/2009 |
| WO | WO 2010/002792 | 1/2010 |

(56) References Cited

FOREIGN PATENT DOCUMENTS

| WO | WO 2010/002886 | 1/2010 |
|---|---|---|
| WO | WO 2010/008686 | 1/2010 |
| WO | WO 2010/033512 | 3/2010 |
| WO | WO 2010/033789 | 3/2010 |
| WO | WO/2010/033789 A2 | 3/2010 |
| WO | WO 2010/068809 | 6/2010 |
| WO | WO 2010/088486 | 8/2010 |
| WO | WO/2010/088486 A1 | 8/2010 |
| WO | WO 2010/124069 | 10/2010 |
| WO | WO 2010/135734 | 11/2010 |
| WO | WO/2011/069510 A1 | 6/2011 |
| WO | WO/2011/096912 A1 | 8/2011 |
| WO | WO 2011/143396 | 11/2011 |

OTHER PUBLICATIONS

PCT/US2012/050561—WO/2013/025600—International Preliminary Report on Patentability, dated Feb. 18, 2014, 9 pages.

PCT/US2014/035804—WO/2014/182499—International Search Report and Written Opinion, dated Aug. 19, 2014, 9 pages.

CN101144025A, Office Action including Search Report, dated Feb. 28, 2015 (6 pages).

Adjaye et al., "Production of hydrocarbons by catalytic upgrading of a pyrolysis bio-oil. Part 1: Conversion over various catalysts", Fuel Processing Technology, vol. 45, pp. 161-183, 1995, 23 pages.

Adjaye et al., "Production of hydrocarbons by catalytic upgrading of a fast pyrolysis bio-oil. Part 2: Comparative catalytic performance and reaction pathways", Fuel Processing Technology, vol. 45, pp. 185-202, 1995, 18 pages.

Diebold et al., "Additives to Lower and Stabilize the Viscosity of Pyrolysis Oils during Storage", American Chemical Society Publications, National renewable Energy Laboratory, Golden Colorado, Energy Fuels, 1997, vol. 11, Issue 5, pp. 1081-1091, 3 pages, Abstract Only.

Elliott et al., "Liquid Fuels by Low-Severity Hydrotreating of Biocrude", Developments in Thermochemical Biomass Conversion, vol. 1, pp. 611-621, A. V. Bridgwater and D. G. B. Boocock, eds., Blackie Academic & Professional, 1996, London, 11 pages.

Gerdes et al., "Alternatives from Wood and Cellulose, Precoat Filtration with Organic Filter Aids", J. Rettenmaier Benelux, Filtration & Separation, vol. 34, No. 10, ISSN 0015-1882, Dec. 1997, 6 pages.

Qi et al., "Review of Biomass Pyrolysis Oil Properties and Upgrading research", Energy Conversion and Management, Issue 48, pp. 87-92, 2007, 6 pages.

World Minerals, "Maximize Biodiesel Yields by Using Celite® Filter Aids, Filtration, Dewatering, Dewaxing and Winterization", Biodiesel, World Minerals Americas and World Headquarters, World Minerals Inc., Santa Barbara, California, USA, 2009, 4 pages.

PCT/US2011/055355—WO/2012/057986—International Search Report and Written Opinion—dated Feb. 24, 2012.

PCT/US2011/055355—WO/2012/057986—International Preliminary Report on Patentability—dated Apr. 30, 2013.

PCT/US2011/055411—WO/2012/057988—International Search Report—dated Mar. 12, 2012.

PCT/US2012/022945—WO/2012/109034—International Search Report—dated Sep. 25, 2012.

PCT/US2012/022951—WO/2012/109035—International Search Report and Written Opinion—dated Sep. 26, 2012.

PCT/US2015/010056—WO2015105732—International Search Report and Written Opinion—dated Apr. 29, 2015.

Bain, "Biodiesel and Other Renewable Diesel Fuels", National Renewable Energy Laboratory, Nov. 2006.

Bridgewater et al., "An Overview of Fast Pyrolysis of Biomass", Organic Geochemistry, 40, 1999, 1479-1493.

Chevron Diesel Technical Fuel Review 2007.

Chiaramonti et al., "Development of Emulsions from Biomass Pyrolysis Liquid and Diesel and Their use in Engines, Part 1: Emulsion Production", Biomass & Bioenergy, 25, 2003, 85-99.

Czernik et al., "Overview of Applications of Biomass Fast Pyrolysis Oil", Energy and Fuels, 18, 2004, 590-598.

Czernik et al., "Stability of Wood Fast Pyrolysis Oil", Biomass and Bioenergy, vol. 7, Nos. 1-6. pp. 187-192.

Deng, "A study on relationship between the compositions and properties of fuel and emissions from diesel engine with fuzzy—gray theory", E3 Journal of Energy Oil and Gas Research, vol. 1 (1), Mar. 2012.

Diebold, "A Review of the Chemical and Physical Mechanisms of the Storage Stability of Fast Pyrolysis Bio-Oils", National Renewable Energy Laboratory, NREL/SR-570-27613, Jan. 2000.

Environmental Protection Agency, "National Emissions Inventory (NEI) Air Pollutant Emissions Trends Data", Technology Transfer Network, Clearinghouse for Emissions Inventories and Emissions Factors, Jun. 2012, 2 pages.

Fukuda et al., "The Effect of Fuel Aromatic Structure and Content on Direct Injection Diesel Engine Particulates", Society of Automotive Engineers, [Progress in Technology] PT; PT-11 (alternative Diesel Fuels), 2004, 259-270.

Garcia-Perez et al., "Production and Fuel Properties of Fast Pyrolysis Oil/Bio-Diesel Blends, "Fuel Processing Technology, Elsevier, 91, 2010, 296-305.

Graboski et al., "The Effect of Biodiesel Composition on Engine Emissions from a DDC Series 60 Diesel Engine", Final Report, Report 2 in a series of 6, Colorado Institute for Fuels and Engine Research, National Renewable Energy Laboratory, Technical Report, NREL/SR-510-31461, Feb. 2003.

Han et al., "Selecting Pour Depressants for Diesel Fuels", Chemistry and Technology of Fuels and Oils, Springer Science & Business Media, Inc., vol. 46, No. 5, 2010.

Hilten et al., "Comparison of Three Accelerated Aging Procedures to Assess Bio-Oil Stability", Elsevier Ltd., Fuel 89, 2010, 2741-2749.

Huber et al., "Production of Liquid Alkanes by Aqueous-Phase Processing of Biomass-Derived Carbohydrates", ScienceMag.Org, vol. 308, Jun. 2005.

Ikura et al., "Emulsification of Pyrolysis Derived Bio-Oil in Diesel Fuel", Biomass & Bioenergy, Elsevier Science, Ltd., 24, 2003, 221-232.

IP Hydrocarbon Management, "HM 40 Guidelines for the crude oil washing of ships' tanks and the heating of crude oil being transported by sea", Energy Institute, London, $2^{nd}$ Edition, Jun. 2004.

Liesenring, "Standard Specification for Diesel Fuel Oils", Designation: D975-11, ASTM International, Jan. 2012.

Mahinpey et al., "Analysis of Bio-Oil, Biogas, and Biochar from Pressurized Pyrolysis of Wheat Straw using a Tubular Reactor, "Energy & Fuels, 23, 2009, 2736-2742.

Mathpro, "An Introduction to Petroleum Refining and the Production of Ultra Low Sulfur Gasoline and Diesel Fuel", Prepared for International on Clean Transportation (icct), Energy Economics Applied Optimization, MathPro, Oct. 2011.

Moens et al., "Study of the Neutralization and Stabilization of a Mixed Hardwood Bio-Oil", Energy & Fuels, 23, 2009, 2695-2699.

Mohan et al., "Pyrolysis of Wood/Biomass for Bio-oil: A Critical Review", Energy & Fuels, 20, 2006, 848-889.

Mrad, et al., "Effects of biofuel from fish oil industrial residue—Diesel blends in diesel engine", Energy, Elsevier Ltd., 44, 2012.

Oasmaa et al., "Fast Pyrolysis of Forestry Residue. 3. Storage Stability of Liquid Fuel", Energy & Fuels, 17, 2003, 1075-1084.

Ozcimen et al., "Production and Characterization of Bio-Oil and Biochard from Rapeseed Cake", Department of Chemical Engineering, Istanbul Technical University, Turkey, Jan. 2003, Renewable Energy, 29, 2004, 779-787.

Pollard, "Comparison of Bio-Oil Produced in a Fractionated Bio-Oil Collection System", Graduate College, Iowa State University, 2009, 173 pages.

Ringer et al., "Large-Scale Pyrolysis Oil Production: A Technology Assessment and Economic Analysis", National Renewable Energy Laboratory, Technical Report, NREL/TP-510-37779, Nov. 2006.

Sanchez et al., "Properties of gasoline and diesel fuels containing renewable drop-in biofuel blend stocks prepared by the thermoscatalytic conversion of lignocellulose", KiOR, Inc. and PetroTech Consultants LLC.

(56) References Cited

OTHER PUBLICATIONS

Sinnott, Chemical Engineering Design, Volume 6, 4$^{th}$Edition, Butterworth-Heinemann—an imprint of Elsevier, 2005, 1038 pages.
Trewella et al., "Renewable Fuel Co-Products—Potential Uses in Asphalt", PetroTech Consultants, LLC, 2012.
Song et al., "Effective Phase Separation of Biomass Pyrolysis Oils by Adding Aqueous Salt Solutions", Energy & Fuels, vol. 23, 2009, pp. 3307-3312.
European Application No. 12824005.8—Supplementary European Search Report—mailed Nov. 19, 2015.

* cited by examiner

PROCESS FOR UPGRADING BIOMASS DERIVED PRODUCTS

BACKGROUND OF THE INVENTION

1. Field of the Invention

The invention relates generally to the alteration of the ratio of the specific gravities of the oil and water phases resulting from the conversion of biomass to liquid products, which can further include the removal of metals and/or the modification of the conductivity, and more particularly to an effective means to reduce the level of solids contained in the oil phase.

2. Description of the Related Art

In the conversion of biomass to liquid products, the product stream can contain both an oil phase and a water phase (containing both water present in the biomass prior to conversion, and water produced during the conversion process). Pyrolysis, in particular flash pyrolysis, has been proposed as one such process for converting solid biomass material to liquid products. Pyrolysis in general refers to a process in which a feedstock is heated in an oxygen-poor or oxygen-free atmosphere. If solid biomass is used as the feedstock of a pyrolysis process, the process produces gaseous, liquid, and solid products. It is often the case that the oil phase has a higher specific gravity than the water phase, resulting in the oil phase settling to the bottom of a settling vessel, and emulsions can also form between the oil and water phases. As a result, any solids present in the reaction products also settle into the oil phase, which can cause issues in downstream processing of the oil, and can be difficult and expensive to remove.

Thus, there is a need for an improved system whereby the solids content of biomass derived oil is reduced.

BRIEF SUMMARY OF THE INVENTION

In accordance with an embodiment of the present invention, a process is provided comprising:
a) providing a first mixture including a first oil phase comprising biomass derived carbon containing compounds and a first aqueous phase comprising water; wherein the ratio of the specific gravities of the first oil phase to the first aqueous phase (SGR1) is greater than 1.0;
b) modifying the specific gravity of at least one of the first oil phase and the first aqueous phase, thereby resulting in a second mixture having a second oil phase and a second aqueous phase, wherein the ratio of the specific gravities of the second oil phase to the second aqueous phase (SGR2) is less than 1.0; and
c) separating the second oil phase from the second aqueous phase.

In accordance with another embodiment of the present invention, such process can additionally comprise:
combining at least one specific gravity modifier comprising a diluent with the first oil phase, thereby forming the second oil phase, and wherein the specific gravity of the second oil phase is lower than the specific gravity of the first oil phase.

In accordance with another embodiment of the present invention, such process can additionally comprise:
combining at least one specific gravity modifier comprising a water-soluble compound with the first aqueous phase, thereby forming the second aqueous phase, and wherein the specific gravity of the second aqueous phase is higher than the specific gravity of the first aqueous phase.

In accordance with another embodiment of the present invention, such process can additionally comprise:
combining at least one specific gravity modifier comprising a water soluble co-solvent with the first aqueous phase, thereby forming the second aqueous phase, and wherein the specific gravity of the second aqueous phase is higher than the specific gravity of the first aqueous phase.

In accordance with another embodiment of the present invention, such process can additionally comprise:
combining at least one specific gravity modifier comprising a diluent, a water-soluble compound, a water soluble co-solvent, and combinations thereof, with the first mixture, thereby forming the second oil phase and the second aqueous phase.

In accordance with another embodiment of the present invention, such process can additionally comprise:
allowing the second mixture to settle, thereby forming an upper layer containing the second oil phase and a lower layer containing the second aqueous phase, wherein the first oil phase contains solids, and following the settling, the second oil phase in the upper layer contains less solids than the first oil phase.

In accordance with another embodiment of the present invention, such process can additionally comprise:
adding a quantity of a conductivity modifier to the first mixture thereby forming the second mixture, wherein the conductivity modifier can have a TAN lower than the TAN of the first mixture, and wherein the quantity of conductivity modifier is sufficient such that the electrical conductivity of the second mixture is lower than the electrical conductivity of the first mixture.

In accordance with another embodiment of the present invention, wherein the first and/or second oil phases further contain metals, a process is provided comprising:
contacting either the first and/or second mixtures with specific acids for removal of at least a portion of the metals from either or both of the first and second oil phases.

DETAILED DESCRIPTION OF THE INVENTION

The biomass material useful in the current invention can be any biomass capable of being converted to liquid and gaseous hydrocarbons.

Preferred are solid biomass materials comprising a cellulosic material, in particular lignocellulosic materials, because of the abundant availability of such materials, and their low cost. The solid biomass feed can comprise components selected from the group consisting of lignin, cellulose, hemicelluloses, and combinations thereof. Examples of suitable solid biomass materials include forestry wastes, such as wood chips and saw dust; agricultural waste, such as straw, corn stover, sugar cane bagasse, municipal waste, in particular yard waste, paper, and card board; energy crops such as switch grass, coppice, eucalyptus; and aquatic materials such as algae; and the like.

The biomass can be converted, by any suitable means, to reaction products comprising, at least in part, a first mixture comprising a first oil phase comprising, consisting of, or consisting essentially of biomass derived carbon containing compounds and a first aqueous phase comprising, consisting of, or consisting essentially of water. The biomass conversion can be by a method including, but not limited to, fast pyrolysis, catalytic pyrolysis, and hydrothermal conversion, each at elevated temperatures. The temperatures can range from 300 to 1000 C, or 400 to 700 C. The first mixture can have a Total Acid Number (TAN) of at least about 2, or at least about 3, or at least about 10, or at least about 20, or at least about 30.

The biomass feed can be charged to a reaction zone along with a heat carrier material and/or a catalyst for mixture with the biomass feed and to transfer heat thereto. Useful catalysts for this process include those containing catalytic acidity and preferably containing zeolite. The biomass feed can be converted to reaction products comprising, consisting of, or consisting essentially of: the first mixture described above, and optionally light gases and/or char. The reaction products can be removed from the reaction zone and the first mixture condensed therefrom. The first mixture can also comprise, consist of, or consist essentially of a first oil phase comprising, consisting of, or consisting essentially of biomass derived carbon containing compounds, and a first aqueous phase comprising, consisting of, or consisting essentially of water, and solids.

The ratio of the specific gravities of the first oil phase to the first aqueous phase (SGR1) can be greater than 1.0, greater than about 1.05, or greater than about 1.1. The specific gravity of at least one of the first oil phase and the first aqueous phase can be modified, thereby resulting in a second mixture having a second oil phase and a second aqueous phase, wherein the ratio of the specific gravities of the second oil phase to the second aqueous phase (SGR2) is less than 1.0, preferably less than about 0.99, and more preferably less than about 0.97.

The modification of the specific gravity of at least one of the first oil phase and the first aqueous phase can include adding at least one specific gravity modifier to the mixture, thereby forming the second mixture.

A diluent can be combined with the first oil phase, as at least a portion of the specific gravity modifier, thereby forming the second oil phase, resulting in the specific gravity of the second oil phase being lower than the specific gravity of the first oil phase. More particularly, the specific gravity of the second oil phase is less than 1.0. The diluent preferably has a specific gravity less than about 0.97. The diluent can be selected from the group consisting of: light cycle oil, naphtha, toluene, methyl isobutyl ketone, reformate, a bio-oil fraction having a specific gravity lower than the specific gravity of the first oil phase, a hydrotreated bio-oil fraction having a specific gravity lower than the specific gravity of the first oil phase, and combinations thereof.

The bio-oil fraction can be obtained as a fraction of the first oil phase following the specific gravity modification step. The hydrotreated bio-oil fraction can optionally be obtained as a fraction of the first oil phase following hydrotreatment of the first oil phase.

The ratio by volume of the diluent to the first oil phase can be in the range of from about 0.6:1 to about 2.4:1, and more preferably from about 0.6:1 to about 1:1. When light cycle oil is used as the diluent, the ratio by volume of the diluent to first oil phase can be in the range of from about 0.05:1 to about 1:1, or from about 0.05:1 to about 0.2:1.

The modification of the specific gravity of at least one of the first oil phase and the first aqueous phase can also include combining a water-soluble compound, as at least a portion of the specific gravity modifier (alone or in addition to the use of a diluent as a specific gravity modifier), with the first aqueous phase, thereby forming the second aqueous phase, and wherein the specific gravity of the second aqueous phase is higher than the specific gravity of the first aqueous phase. Preferably, the specific gravity of the second aqueous phase ends up being greater than about 1.05. The water-soluble compound can be selected from the group consisting of NaCl, $MgCl_2$, KCl, KBr, $Na_2SO_4$, $NaHCO_3$, NaOH, KOH, $NH_4OH$, alkyl amines, pyridines, quinolines, $H_2S$, ammonia, ammonium compounds including: nitrates, sulfides, carbonates (such as ammonium bicarbonate), hydroxides, acetates, chlorides, bromides, iodides, and sulfates, and combinations thereof.

The water-soluble compound can be added as a solid and dissolved into the first aqueous phase, and can also, alternatively, be added in the form of a water-soluble compound solution. The water-soluble compound is preferably ammonium bicarbonate, NaCl, or $MgCl_2$. The water-soluble compound is preferably combined with the first aqueous phase in a quantity sufficient to result in a specific gravity of the second aqueous phase which is greater than about 1.05.

The modification of the specific gravity of at least one of the first oil phase and the first aqueous phase can also include combining a water-soluble co-solvent, as at least a portion of the specific gravity modifier (alone or in addition to the use of one or both of the diluent or water-soluble compound as specific gravity modifiers), with the first aqueous phase, thereby forming the second aqueous phase, and wherein the specific gravity of the second aqueous phase is higher than the specific gravity of the first aqueous phase. The water soluble co-solvent can be a glycol, and more preferably, is selected from the group consisting of ethylene glycol, polyethylene glycol, propylene glycol, polypropylene glycol, and combinations thereof. The resulting specific gravity of the second aqueous phase is preferably greater than about 1.05.

More generally, the at least one specific gravity modifier added to the first mixture can also be selected from the group consisting of a light cycle oil, naphtha, toluene, methyl isobutyl ketone, reformate, a bio-oil fraction having a specific gravity lower than the specific gravity of said first oil phase, a hydrotreated bio-oil fraction having a specific gravity lower than the specific gravity of said first oil phase, NaCl, $MgCl_2$, KCl, KBr, $Na_2SO_4$, $NaHCO_3$, NaOH, KOH, $NH_4OH$, alkyl amines, pyridines, quinolines, $H_2S$, ammonia, ammonium compounds including: nitrates, sulfides, carbonates (such as ammonium bicarbonate), hydroxides, acetates, chlorides, bromides, iodides, and sulfates, a glycol, and combinations thereof.

The second mixture is preferably allowed to settle in a settling vessel, thereby forming an upper layer containing the second oil phase and a lower layer containing the second aqueous phase. The first oil phase can contain solids, which can be present in an amount of at least about 100, or about 1000, or about 3,000 ppmw. The solids can include, but are not limited to, organic and inorganic components, which can include solid catalyst material. Following the settling of the second mixture, the second oil phase in the upper layer contains less solids than the first oil phase; and can contain less than about 25, or about 10, or about 5 wt % of the solids contained in the first oil phase; and preferably contains less than about 80 ppmw solids.

When a diluent is used as at least one specific gravity modifier, at least a portion of the second oil phase in the upper layer can be passed to a separator for recovery of at least a portion of the diluent, resulting in a recovered diluent. At least a portion of the recovered diluent can be recycled for use as at least a portion of the diluent.

Additionally, when a diluent is used as at least one specific gravity modifier, at least a portion of the second oil phase can be passed to a separator for recovery of at least one bio-oil fraction from the second oil phase. At least one of the bio-oil fractions can be utilized, as at least a portion of the diluent.

Further, when a diluent is used as at least one specific gravity modifier, at least a portion of the second oil phase can be passed to a hydrotreater for at least partial hydrotreating, thereby forming a hydrotreated stream, and at least a portion of the hydrotreated stream can be passed to a separator for separation into at least one hydrotreated bio-oil fraction. At least one of the hydrotreated bio-oil fractions can be utilized as at least a portion of the diluent.

Alternatively, a quantity of a conductivity modifier can also be added to the first mixture thereby forming the second mixture, wherein the quantity of the conductivity modifier is sufficient such that the electrical conductivity of the second mixture is lower than the electrical conductivity of the first mixture. The first mixture can have an electrical conductivity of at least about 900,000, or at least about 950,000 nano Siemens per meter (nS/m); and the second mixture preferably has an electrical conductivity less than about 800,000 or less than about 500,000 nS/m. In one embodiment, the conductivity modifier can have a TAN lower than the TAN of the first mixture, and preferably has a TAN at least about 2 units lower than the TAN of the first mixture. The electrical conductivity of the second mixture is preferably less than about 75%, more preferably less than about 50%, and even more preferably less than about 25% of the electrical conductivity of the first mixture.

The conductivity modifier can be selected from the group consisting of an aqueous solution, a fraction separated from the biomass derived carbon containing compounds, a fraction separated from the biomass derived carbon containing compounds following hydrotreatment of the biomass derived carbon containing compounds, and combinations thereof. The conductivity modifier can comprise an aqueous solution having a pH greater than 7 or greater than about 9. The aqueous solution can comprise a base selected from the group consisting of NaOH, KOH, $NH_4OH$, alkyl amines, pyridines, quinolines, ammonia, ammonium compounds including: nitrates, sulfides, carbonates, hydroxides, acetates, chlorides, bromides, iodides, and sulfates, and combinations thereof, and is preferably ammonium bicarbonate or ammonium hydroxide or a combination thereof. Combinations of bases can be added separately or simultaneously as a pre-mixed solution. If added separately, they can be added at different process conditions including different temperature and different pressures. Buffers may also be used to more tightly control pH.

In addition, at least a portion of the first mixture and/or the resulting second mixture can be in the form of an emulsion comprising a portion of the biomass derived carbon containing compounds and a portion of the water. The second mixture, including the conductivity modifier described above, can be subjected to electrostatic dehydration, resulting in at least a partial breaking of the emulsion, and freeing from the emulsion at least 75%, or at least 90%, or at least 95% of the biomass derived carbon containing compounds contained in the emulsion or at least 50%, or at least 70%, or at least 95% of the water contained in the emulsion. Also, the second mixture, following electrostatic dehydration, preferably has an electrical conductivity less than about 250,000 nS/m. The electrostatic dehydration is preferably performed in a desalter vessel. Also, a demulsifier compound can be added to the first mixture, along with the conductivity modifier, thereby forming the second mixture which is then subjected to the electrostatic dehydration. The demulsifier can be an alkoxylate derived from a poly amine.

In addition, the first and second oil phases can each further comprise metals, which can be selected from the group consisting of Al, Ca, Mg, Si, Fe, and combinations thereof. At least a portion of these metals can be removed from either the first oil phase or the second oil phase, or both, into either the first or second aqueous phases by contact of either or both of the first mixture and the second mixture with certain acids. If metals are removed from the first oil phase into the first aqueous phase by contact with such acid(s), the conductivity modifier can then optionally be added to form the second mixture, having a reduced electrical conductivity, as described above. The removal of at least a portion of the metals can also take place from the second oil phase into the second aqueous phase following addition of the conductivity modifier, and also optionally, before or after the electrostatic dehydration of the second mixture to at least partially break the emulsion, as described above.

The acid can be selected from the group consisting of sulfuric acid, nitric acid, hydrochloric acid, phosphoric acid, glycolic acid, aminocarboxylic acids, hydroxo-carboxylic acids, dibasic carboxylic acids, monobasic carboxylic acids, carbonic acid, alpha-hydroxy carboxylic acids, and their salts, and combinations thereof. The acid also preferably has a pH less than about 5.

The acid and metal interaction can include, but is not limited to, a process selected from the group consisting of: chemically binding at least a portion of the metals; removing at least a portion of the metals from the first and or second oil phases; or combinations thereof.

The following examples are provided to further illustrate this invention and are not to be considered as unduly limiting the scope of this invention.

EXAMPLES

Example I

A product mixture produced from the thermo-catalytic pyrolysis of southern yellow pine wood chips was collected and allowed to settle. The organic phase (raw bio-oil) for the product mixture settled to a position below the water phase. A 45 ml. quantity of the raw bio-oil, separated from the product mixture, was mixed with a 45 ml. quantity of an un-hydrotreated bio-naphtha fraction of the bio-oil (bio-naphtha). A 10 ml. quantity of process water separated from the product mixture was also added to the raw bio-oil and bio-naphtha. A total of twenty four (24) 100 ml. samples were prepared in this way. The resulting samples were each mixed for around 20 seconds and placed in a 140 F water bath for around 1 hour. Upon settling, the organic phase (blended bio-oil) layer for each sample was flipped and on top, with the water phase on the bottom of the containers. The blended bio-oil for each sample was then extracted and all extracted blended bio-oils combined in one container. The container was then mixed for around 20 seconds and an aliquot was tested for filterable solids through a 0.2 μm PVDF membrane filter. A sample of the raw bio-oil separated from the product mixture was also tested for filterable solids through a 0.2 μm PVDF membrane filter. The amount of solids in the blended (flipped) bio-oil was about 610 ppm (with 1220 ppm attributed to the raw bio-oil portion), compared to about 3,558 ppm for the un-flipped raw bio-oil.

As can be seen from the data above, the solids content in the bio-oil drops significantly once the oil and water layers are flipped. This provides substantial benefits for downstream processing of the bio-oil, such as hydrotreatment, and significantly reduces the cost of any subsequently required solids removal.

Example II

A product mixture produced from the thermo-catalytic pyrolysis of southern yellow pine wood chips was collected and allowed to settle. The organic phase (raw bio-oil) for the product mixture settled to a position below the water phase. A 100 ml. quantity of the raw bio-oil, separated from the product mixture, was mixed with a 100 ml. quantity of an unhydrotreated bio-naphtha fraction of the raw bio-oil. The 200 ml. bio-oil/bio-naphtha mixture was split into four samples. Each of the four samples was combined with 50 ml. quantities of process water separated from the product mixture. Three different demulsifier additives were added to three of the samples. The four samples were each mixed for around 20 seconds and placed in a 140 F water bath for around 30 minutes. The organic phase (blended bio-oil) layer for each sample was flipped and on top, with the water phase on the bottom of the containers. The blended bio-oil for each sample was then extracted. Each of the four extracted blended bio-oils were mixed for around 20 seconds, and aliquots of each were tested for filterable solids through a 0.2 µm PVDF membrane filter. The amount of solids contained in the three blended (flipped) bio-oil samples including desalter additives were about 205, 193, and 400 ppm; and the amount of solids contained in the blended (flipped) bio-oil sample not including a desalter additive was about 492 ppm. The desalter additives used were from Champion Technologies and designated as XZ-1677, Code 80 and EC-1-C, respectively.

Example III

A product mixture produced from the thermo-catalytic pyrolysis of southern yellow pine wood chips was collected and allowed to settle. The organic phase (raw bio-oil) for the product mixture settled to a position below the water phase. A quantity of the total product mixture was mixed with a quantity of a Light Cycle Oil (LCO) obtained from a crude oil refinery. The product mixture/LCO mixture was vigorously mixed for around 30 seconds. The product mixture/LCO mixture was then centrifuged to separate out the blended bio-oil. The blended bio-oil, as well as a sample of the raw bio-oil from the product mixture, were then tested for ash content. The ash content of the blended bio-oil was only about 0.007 wt %, compared to about 0.146 wt % for the control raw bio-oil.

As can be seen from the data above, the ash content in the bio-oil drops significantly once the oil and water layers are flipped.

Example IV

A product mixture produced from the thermo-catalytic pyrolysis of southern yellow pine wood chips was collected and allowed to settle. The organic phase (raw bio-oil, pH of about 4.5) for the product mixture settled to a position below the product water phase (pH of about 4-5). Three separate quantities of the total product mixture were mixed with quantities of LCO sufficient such that the resulting organic phases of the mixtures contained about 5 wt %, about 10 wt %, and about 20 wt % LCO, respectively. The density of the product water portions of the three mixtures were also modified by adding NaCl such that the resulting product water for each mixture contained about 2M NaCl. For each of the mixtures, the organic phase (blended bio-oil) layer was flipped and on top, with the 2M NaCl product water phase on the bottom of the container. The density of the bio-oil vs. percent of LCO added is shown in Table 1 below.

TABLE 1

| | % LCO in blended bio-oil | | | |
| --- | --- | --- | --- | --- |
| | 0 | 5 | 10 | 20 |
| Blended bio-oil Density (g/ml) | 1.10 | 1.08 | 1.07 | 1.05 |

Example V

A product mixture produced from the thermo-catalytic pyrolysis of southern yellow pine wood chips was collected and allowed to settle. The organic phase (raw bio-oil, pH of about 4.5, density of about 1.095) for the product mixture settled to a position below the product water phase. Six separate quantities of the bio-oil (separated from the product water) were mixed with quantities of distilled water (pH of about 7). NaCl was added to five of the bio-oil/water mixtures such that the distilled water portions separately contained about 1M NaCl, about 2M NaCl, about 3M NaCl, about 4M NaCl, and about 5M NaCl, respectively. For each of the 3M, 4M, and 5M NaCl mixtures, the organic phase (blended bio-oil) layer was clearly flipped and on top, with the water phase on the bottom of the container. For the 2M NaCl mixture, the layers were mostly, but not completely, flipped, and the layers were not flipped for the 1M NaCl mixture.

Example VI

A product mixture produced from the thermo-catalytic pyrolysis of southern yellow pine wood chips was collected and allowed to settle. The organic phase (raw bio-oil, pH of about 4.5, density of about 1.095) for the product mixture settled to a position below the product water phase. Six separate quantities of the bio-oil (separated from the product water) were mixed with quantities of distilled water (pH of about 7). $MgCl_2$ was added to five of the bio-oil/water mixtures such that the distilled water portions separately contained about 1M $MgCl_2$, about 2M $MgCl_2$, about 3M $MgCl_2$, about 4M $MgCl_2$, and about 5M $MgCl_2$, respectively. For each of the 3M, 4M, and 5M $MgCl_2$ mixtures, the organic phase (blended bio-oil) layer was clearly flipped and on top, with the water phase on the bottom of the container. For the 2M $MgCl_2$ mixture, the layers were partially flipped, and the layers were not flipped for the 1M $MgCl_2$ mixture.

Example VII

A product mixture produced from the thermo-catalytic pyrolysis of southern yellow pine wood chips was collected and allowed to settle. The organic phase (raw bio-oil, pH of about 4.5, density of about 1.085) for the product mixture settled to a position below the product water phase (pH ~4-5). The product mixture was separated into six quantities. NaCl was added to five of the product mixture samples such that those five product water portions separately contained about 1M NaCl, about 2M NaCl, about 3M NaCl, about 4M NaCl, and about 5M NaCl, respectively. For each of the 3M, 4M, and 5M NaCl mixtures, the organic phase layer was clearly flipped and on top, with the product water phase on the bottom of the container.

Example VIII

A product mixture produced from the thermo-catalytic pyrolysis of southern yellow pine wood chips was collected and allowed to settle. The organic phase (raw bio-oil) for the product mixture settled to a position below the water phase, and had a TAN of 6.1. A 20.1 gram quantity of ammonium bicarbonate was combined with an 82 gram quantity of process water separated from the product mixture to form a modified water solution containing about 19.7 wt % ammonium bicarbonate. A 19.9 gram quantity of the modified water solution was combined with 91 grams of the raw bio-oil separated from the product mixture. The organic phase (raw bio-oil) layer was flipped and on top, with the modified water phase on the bottom of the container.

Example IX

Raw bio-oil was separated from a product mixture produced from the thermo-catalytic pyrolysis of southern yellow pine wood chips. The raw bio-oil had a TAN of 6.1; 3.2 vol % water (determined by the Karl Fischer titration method); and 5,000 ppm solids. A quantity of the raw bio-oil was blended with a quantity of a bio-naphtha fraction separated from the raw bio-oil by distillation to form a 50/50 blend (by volume). The 50/50 blend contained about 4.0 wt % BS&W (basic sediment and water). A quantity of the 50/50 blend was centrifuged, removing a major portion of the free water and solids, amounting to about 3 wt %, resulting in a centrifuged blend containing about 1.0 wt % BS&W. A quantity of the centrifuged blend was then neutralized with a 3 wt % NaOH aqueous solution to reduce the TAN to about 0 (no TAN measurable). For maximum dehydration, the neutralized blend was also treated at 2.5 kV/inch AC electricity following addition of 100 ppm of a demulsifier obtained from Croda, commercially available under the trade name Croda D510. The resulting neutralized blend contained about 0 wt % (trace) BS&W. Each of the 50/50 blend, the centrifuged blend, and the neutralized blend were tested for conductivity at various temperatures. Results of such tests are shown in Table 2 below.

TABLE 2

|  | "As Is" 50/50 Blend | Centrifuged Blend | Neutralized and Electrostatically Treated Blend |
| --- | --- | --- | --- |
| BS&W | ~4% | ~1% | ~0% |
| Temp. (F.) | Specific Conductivity (nS/m) | | |
| 80 | 1,150,000 | 296,667 | — |
| 90 | | | 67,333 |
| 120 | | 373,333 | 88,667 |
| 160 | | 502,000 | 120,667 |
| 200 | | 590,000 | 139,333 |
| 240 | | 702,667 | 140,667 |
| 280 | | 826,667 | 133,333 |

As can be seen from the data in Table 2, the addition of a neutralizing base to the bio-oil/bio-naphtha blend, along with electrostatic treatment, results in a significant decrease in conductivity. Thus, rather than leading to an expected increase in conductivity, it was unexpectedly found that the addition of a base to the system actually reduced the conductivity.

Example X

Raw bio-oil was separated from a product mixture produced from the thermo-catalytic pyrolysis of southern yellow pine wood chips. A quantity of the raw bio-oil was blended with a quantity of an un-hydrotreated bio-naphtha fraction of the raw bio-oil to form a 50/50 blend (by volume), which was then stirred for 1 hour at 300 RPM. For each of the acid treatment tests, an 80 ml quantity of the blend was mixed with 20 ml of an aqueous acid solution, and blended for 15 seconds. The aqueous acid solutions were prepared by mixing the acids into process water produced in the thermo-catalytic pyrolysis of the wood chips. As a control, one of the tested samples was prepared using process water without added acid. The samples were placed in a 140 F water bath for 30 minutes. The samples were then filtered through a 0.2 μm PVDF membrane filter and tested for metals using inductively coupled plasma mass spectrometry (ICP-MS). The metals content results are shown in Table 3 below.

TABLE 3

| Metal | Raw Bio-oil | 5% Sulfuric Acid | 5% Phosphoric Acid | Blank (No added Acid) | 5% Nitric Acid | 5% Glycolic Acid |
| --- | --- | --- | --- | --- | --- | --- |
| Al | 98.5 | 0 | 1.147 | 8.27 | 0.1339 | 2.998 |
| Ca | 69 | 0.56 | 0.797 | 0.4383 | 0.4059 | 1.129 |
| Cl | 0.749 | 0.2386 | 0.3886 | 0.563 | 0.3327 | 0.2361 |
| Co | 0.0427 | 0.0705 | 0.1086 | 0.1128 | 0 | 0.0847 |
| Cr | 0.3501 | 0 | 0.0102 | 0 | 0.003 | 0.0063 |
| Cu | 0.1094 | 0 | 0.032 | 0.0556 | 0.0371 | 0.032 |
| Fe | 12.33 | 0.0507 | 0.2298 | 4.615 | 0.596 | 2.287 |
| K | 14.07 | 0.0057 | 0.0665 | 0.0096 | 0.0132 | 0.0354 |
| Mg | 20.71 | 0 | 0.0176 | 0.0092 | 0 | 0.012 |
| Mn | 8.44 | 0.2603 | 0.0999 | 0.0941 | 0 | 0.0043 |
| Mo | 0.0143 | 0 | 0.0222 | 0 | 0 | 0 |
| Na | 1.16 | 2.999 | 12.19 | 3.195 | 0.2063 | 3.083 |
| Ni | 0.1241 | 0.0507 | 0.0516 | 0.0395 | 0.0596 | 0.0654 |
| P | 64.3 | 0.3506 | 1.731 | 0.723 | 1.168 | 0.512 |
| S | 9.66 | 0 | 0 | 0 | 0 | 0 |
| Si | 9.68 | 0.0581 | 0.0597 | 0.0668 | 0 | 0 |
| Ti | 2.237 | 0.562 | 0.2747 | 0.809 | 0 | 0.562 |
| V | 3.139 | 0 | 0.2057 | 1.468 | 0.0351 | 1.444 |
| Zn | 1.269 | 0.0249 | 0.0634 | 0.182 | 0.0126 | 0.2116 |
| Total Metals | 315.885 | 5.2311 | 17.4955 | 20.6509 | 3.0034 | 12.7028 |

As can be seen from the test results in Table 3, contacting bio-oil, which contains metals, with an aqueous acid solution including the above acids results in a substantial lowering of the wt % of dissolved metals in the resulting treated bio-oil.

While the technology has been particularly shown and described with reference to specific embodiments, it should be understood by those skilled in the art that various changes in form and detail may be made without departing from the spirit and scope of the technology as defined by the appended claims.

That which is claimed is:

1. A method comprising:
    a) providing a first mixture comprising reaction products produced from catalytic conversion of biomass at temperatures ranging from 300° C. to 1000° C., wherein the reaction products include a first oil phase comprising biomass-derived, carbon-containing compounds and a first aqueous phase comprising water, wherein the ratio of the specific gravities of the first oil phase to the first aqueous phase ($SGR^1$) is greater than 1.0;
    b) modifying the specific gravity of at least one of said first oil phase and said first aqueous phase, thereby resulting in a second mixture having a second oil phase and a second aqueous phase, wherein the ratio of the specific gravities of said second oil phase to said second aqueous phase ($SGR^2$) is less than 1.0; and
    c) separating at least a portion of said second oil phase from said second mixture.

2. The method of claim 1 wherein said $SGR^1$ is greater than about 1.05.

3. The method of claim 1 wherein said $SGR^1$ is greater than about 1.1.

4. The method of claim 1 wherein said $SGR^2$ is less than about 0.99.

5. The method of claim 1 wherein said $SGR^2$ is less than about 0.97.

6. The method of claim 1 wherein step b) includes adding at least one specific gravity modifier to said first mixture, thereby forming said second mixture.

7. The method of claim 6 wherein said at least one specific gravity modifier comprises a diluent which is combined with said first oil phase, thereby forming said second oil phase, and wherein the specific gravity of said second oil phase is lower than the specific gravity of said first oil phase.

8. The method of claim 7 wherein the specific gravity of said second oil phase is less than 1.0.

9. The method of claim 7 wherein said diluent has a specific gravity less than about 0.97.

10. The method of claim 7 wherein said diluent is selected from the group consisting of: light cycle oil, naphtha, toluene, methyl isobutyl ketone, reformate, a bio-oil fraction having a specific gravity lower than the specific gravity of said first oil phase, a hydrotreated bio-oil fraction having a specific gravity lower than the specific gravity of said first oil phase, and combinations thereof.

11. The method of claim 7 wherein the ratio by volume of said diluent to said first oil phase is in the range of from about 0.6:1 to about 2.4:1.

12. The method of claim 7 wherein the ratio by volume of said diluent to said first oil phase is in the range of from about 0.6:1 to about 1:1.

13. The method of claim 10 wherein said diluent is a bio-oil fraction having a specific gravity lower than the specific gravity of said first oil phase.

14. The method of claim 13 wherein said bio-oil fraction is obtained as a fraction of said first oil phase following step b).

15. The method of claim 10 wherein said diluent is a hydrotreated bio-oil fraction having a specific gravity lower than the specific gravity of said first oil phase.

16. The method of claim 15 wherein said hydrotreated bio-oil fraction is obtained as a fraction of said first oil phase following hydrotreatment of said first oil phase.

17. The method of claim 6 wherein said at least one specific gravity modifier comprises a water-soluble compound which is combined with said first aqueous phase, thereby forming said second aqueous phase, and wherein the specific gravity of said second aqueous phase is higher than the specific gravity of said first aqueous phase.

18. The method of claim 17 wherein the specific gravity of said second aqueous phase is greater than about 1.05.

19. The method of claim 17 wherein said water-soluble compound is selected from the group consisting of NaCl, $MgCl_2$, KCl, KBr, $Na_2SO_4$, $NaHCO_3$, ammonium bicarbonate, NaOH, KOH, $NH_4OH$, alkyl amines, pyridines, quinolines, $H_2S$, ammonia, ammonium compounds including: nitrates, sulfides, carbonates, hydroxides, acetates, chlorides, bromides, iodides, and sulfates, and combinations thereof.

20. The method of claim 17 wherein said water-soluble compound is added as a solid and dissolved into said first aqueous phase.

21. The method of claim 17 wherein said water-soluble compound is added in the form of a water-soluble compound solution.

22. The method of claim 19 wherein said water-soluble compound is ammonium bicarbonate.

23. The method of claim 19 wherein said water-soluble compound is NaCl.

24. The method of claim 19 wherein said water-soluble compound is $MgCl_2$.

25. The method of claim 17 wherein said water-soluble compound is combined with said first aqueous phase in a quantity sufficient to result in a specific gravity of said second aqueous phase which is greater than about 1.05.

26. The method of claim 6 wherein said at least one specific gravity modifier comprises a water soluble co-solvent which is combined with said first aqueous phase, thereby forming said second aqueous phase, and wherein the specific gravity of said second aqueous phase is higher than the specific gravity of said first aqueous phase.

27. The method of claim 26 wherein said water soluble co-solvent is a glycol.

28. The method of claim 27 wherein said water soluble co-solvent is selected from the group consisting of ethylene glycol, polyethylene glycol, propylene glycol, polypropylene glycol, and combinations thereof.

29. The method of claim 28 wherein the specific gravity of said second aqueous phase is greater than about 1.05.

30. The method of claim 6 wherein said at least one specific gravity modifier added to said first mixture is selected from the group consisting of a light cycle oil, naphtha, toluene, methyl isobutyl ketone, reformate, a bio-oil fraction having a specific gravity lower than the specific gravity of said first oil phase, a hydrotreated bio-oil fraction having a specific gravity lower than the specific gravity of said first oil phase, NaCl, $MgCl_2$, KCl, KBr, $Na_2SO_4$, $NaHCO_3$, ammonium bicarbonate, NaOH, KOH, $NH_4OH$, alkyl amines, pyridines, quinolines, $H_2S$, ammonia, ammonium compounds including: nitrates, sulfides, carbonates, hydroxides, acetates, chlorides, bromides, iodides, and sulfates, a glycol, and combinations thereof.

31. The method of claim 7 further comprising, prior to step c):

b1) allowing said second mixture to settle, thereby forming an upper layer containing said second oil phase and a lower layer containing said second aqueous phase; and, following step c), further comprising:

d) passing at least a portion of said second oil phase to a separator for recovery of at least a portion of said diluent, resulting in a recovered diluent; and e) recycling at least a portion of said recovered diluent for use in step b) as at least a portion of said diluent.

32. The method of claim 7 further comprising, prior to step c):

b1) allowing said second mixture to settle, thereby forming an upper layer containing said second oil phase and a lower layer containing said second aqueous phase; and, following step c), further comprising:

d) passing at least a portion of said second oil phase to a separator for recovery of at least one bio-oil fraction from said second oil phase; and e) utilizing at least one of said bio-oil fractions as at least a portion of said diluent.

33. The method of claim 7 further comprising, prior to step c):

b1) allowing said second mixture to settle, thereby forming an upper layer containing said second oil phase and a lower layer containing said second aqueous phase; and, following step c), further comprising:

d) passing at least a portion of said second oil phase to a hydrotreater for at least partial hydrotreating, thereby forming a hydrotreated stream;

e) passing at least a portion of said hydrotreated stream to a separator for separation into at least one hydrotreated bio-oil fraction; and f) utilizing at least one of said hydrotreated bio-oil fractions as at least a portion of said diluent in step b).

34. The method of claim 1 further comprising, prior to step c:

b1) allowing said second mixture to settle, thereby forming an upper layer containing said second oil phase and a lower layer containing said second aqueous phase.

35. The method of claim 34 wherein, following step b1), said second oil phase in said upper layer contains less solids than said first oil phase.

36. The method of claim 34 wherein said first oil phase contains at least about 100 ppmw solids, and following step b1), said second oil phase in said upper layer contains less than about 25 wt % of the solids contained in said first oil phase.

37. The method of claim 36 wherein said second oil phase in said upper layer contains less than about 10 wt % of the solids contained in said first oil phase.

38. The method of claim 36 wherein said second oil phase in said upper layer contains less than about 5 wt % of the solids contained in said first oil phase.

39. The method of claim 34 wherein said first oil phase contains at least about 100 ppmw solids, and following step b1), said second oil phase in said upper layer contains less than about 80 ppmw solids.

40. The method of claim 1 wherein a quantity of a conductivity modifier is also added to said first mixture in step b) thereby forming said second mixture, wherein said quantity of said conductivity modifier is sufficient such that the electrical conductivity of said second mixture is lower than the electrical conductivity of said first mixture.

41. The method of claim 40 wherein said first mixture has a TAN greater than 0, and wherein said conductivity modifier has a TAN lower than the TAN of said first mixture.

42. The method of claim 40 wherein said first mixture has a TAN of at least about 2.

43. The method of claim 40 wherein said first mixture has a TAN of at least about 3.

44. The method of claim 40 wherein said first mixture has a TAN of at least about 10.

45. The method of claim 40 wherein the TAN of said conductivity modifier is at least about 2 units lower than the TAN of said first mixture.

46. The method of claim 40 wherein the electrical conductivity of said second mixture is less than about 75% of the electrical conductivity of said first mixture.

47. The method of claim 40 wherein the electrical conductivity of said second mixture is less than about 50% of the electrical conductivity of said first mixture.

48. The method of claim 40 wherein the electrical conductivity of said second mixture is less
than about 25% of the electrical conductivity of said first mixture.

49. The method of claim 40 wherein said conductivity modifier is selected from the group consisting of an aqueous solution, a fraction separated from said biomass-derived, carbon-containing compounds, a fraction separated from said biomass-derived, carbon-containing compounds following hydrotreatment of said biomass-derived, carbon-containing compounds, and combinations thereof.

50. The method of claim 48 wherein said conductivity modifier comprises an aqueous solution having a pH greater than 7.

51. The method of claim 48 wherein said conductivity modifier comprises an aqueous solution having a pH greater than about 9.

52. The method of claim 50 wherein said aqueous solution comprises a base selected from the group consisting of and combinations thereof NaOH, KOH, $NH_4OH$, alkyl amines, pyridines, quinolines, ammonia, ammonium compounds including: nitrates, sulfides, carbonates, hydroxides, acetates, chlorides, bromides, iodides, and sulfates, and combinations thereof.

53. The method of claim 52 wherein said base is selected from the group consisting of ammonium bicarbonate, ammonium hydroxide or combinations thereof.

54. The method of claim 40 wherein either or both of said first oil phase and said second oil phase further comprise metals, and wherein either or both of said first oil phase and said second oil phase is contacted with an acid for removal of at least a portion of said metals from either or both of said first oil phase and said second oil phase.

55. The method of claim 54 wherein said acid interacts with said metals by a process selected from the group consisting of: chemically binding at least a portion of said metals; removing at least a portion of said metals from either or both of said first oil phase and said second oil phase; or combinations thereof.

56. The method of claim 54 wherein said acid is selected from the group consisting of sulfuric acid, nitric acid, hydrochloric acid, phosphoric acid, glycolic acid, aminocarboxylic acids, hydroxo-carboxylic acids, dibasic carboxylic acids, monobasic carboxylic acids, carbonic acid, and their salts, and combinations thereof.

57. The method of claim 54 wherein said acid is selected from the group consisting of sulfuric acid, nitric acid, phosphoric acid, glycolic acid, and their salts, and combinations thereof.

58. The method of claim 54 wherein said acid has a pH less than about 5.

59. The method of claim 54 wherein said metals are selected from the group consisting of Al, Ca, Mg, Si, Fe, and combinations thereof.

60. The method of claim 40 wherein at least a portion of said first mixture is in the form of an emulsion comprising a portion of said biomass-derived, carbon-containing compounds and a portion of said water.

61. The method of claim 60 wherein said second mixture is subjected to electrostatic dehydration, resulting in at least a partial breaking of said emulsion, and freeing from said emulsion at least 75% of said biomass-derived, carbon-containing compounds contained in said emulsion.

62. The method of claim 60 wherein said second mixture is subjected to electrostatic dehydration, resulting in at least a partial breaking of said emulsion, and freeing from said emulsion at least 90% of said biomass-derived, carbon-containing compounds contained in said emulsion.

63. The method of claim 60 wherein said second mixture is subjected to electrostatic dehydration, resulting in at least a partial breaking of said emulsion, and freeing from said emulsion at least 95% of said biomass-derived, carbon-containing compounds contained in said emulsion.

64. The method of claim 60 wherein said second mixture is subjected to electrostatic dehydration, resulting in at least a partial breaking of said emulsion, and freeing from said emulsion at least 50% of said water contained in said emulsion.

65. The method of claim 60 wherein said second mixture is subjected to electrostatic dehydration, resulting in at least a partial breaking of said emulsion, and freeing from said emulsion at least 70% of said water contained in said emulsion.

66. The method of claim 60 wherein said second mixture is subjected to electrostatic dehydration, resulting in at least a partial breaking of said emulsion, and freeing from said emulsion at least 95% of said water contained in said emulsion.

67. The method of claim 61 wherein said electrostatic dehydration is performed in a desalter vessel.

68. The method of claim 61 wherein a demulsifier compound is added to said first mixture, along with said conductivity modifier, thereby forming said second mixture which is then subjected to said electrostatic dehydration.

69. The method of claim 68 wherein said demulsifier is an alkoxylate derived from a poly amine.

70. The method of claim 1 wherein either or both of each of said first oil phase and said second oil phase further comprise metals, and wherein either or both of said first oil phase and said second oil phase is contacted with an acid for removal of at least a portion of said metals from either or both of said first oil phase and said second oil phase.

71. The method of claim 70 wherein said acid interacts with said metals by a process selected from the group consisting of: chemically binding at least a portion of said metals; removing at least a portion of said metals from either or both of said first oil phase and said second oil phase; or combinations thereof.

72. The method of claim 70 wherein said acid is selected from the group consisting of sulfuric acid, nitric acid, hydrochloric acid, phosphoric acid, glycolic acid, aminocarboxylic acids, hydroxo-carboxylic acids, dibasic carboxylic acids, monobasic carboxylic acids, carbonic acid, and their salts, and combinations thereof.

73. The method of claim 70 wherein said acid is selected from the group consisting of sulfuric acid, nitric acid, phosphoric acid, glycolic acid, and their salts, and combinations thereof.

74. The method of claim 70 wherein said acid has a pH less than about 5.

75. The method of claim 70 wherein said metals are selected from the group consisting of Al, Ca, Mg, Si, Fe, and combinations thereof.

76. The method of claim 70 wherein a quantity of a conductivity modifier is also added to said first mixture in step b) thereby forming said second mixture, wherein said quantity of said conductivity modifier is sufficient such that the electrical conductivity of said second mixture is lower than the electrical conductivity of said first mixture.

77. The method of claim 76 wherein said first mixture has a TAN greater than 0, and wherein said conductivity modifier has a TAN lower than the TAN of said first mixture.

78. The method of claim 76 wherein said first mixture has a TAN of at least about 2.

79. The method of claim 76 wherein said first mixture has a TAN of at least about 3.

80. The method of claim 76 wherein said first mixture has a TAN of at least about 10.

81. The method of claim 76 wherein the TAN of said conductivity modifier is at least about 2 units lower than the TAN of said first mixture.

82. The method of claim 76 wherein the electrical conductivity of said second mixture is less than about 75% of the electrical conductivity of said first mixture.

83. The method of claim 76 wherein the electrical conductivity of said second mixture is less than about 50% of the electrical conductivity of said first mixture.

84. The method of claim 76 wherein the electrical conductivity of said second mixture is less than about 25% of the electrical conductivity of said first mixture.

85. The method of claim 76 wherein said conductivity modifier is selected from the group consisting of an aqueous solution, a fraction separated from said biomass derived carbon containing compounds, a fraction separated from said biomass-derived, carbon-containing compounds following hydrotreatment of said biomass-derived, carbon-containing compounds, and combinations thereof.

86. The method of claim 76 wherein said conductivity modifier comprises an aqueous solution having a pH greater than 7.

87. The method of claim 86 wherein said conductivity modifier comprises an aqueous solution having a pH greater than about 9.

88. The method of claim 86 wherein said aqueous solution comprises a base selected from the group consisting of and combinations thereof NaOH, KOH, NH4OH, alkyl amines, pyridines, quinolines, ammonia, ammonium compounds including: nitrates, sulfides, carbonates, hydroxides, acetates, chlorides, bromides, iodides, and sulfates, and combinations thereof.

89. The method of claim 88 wherein said base is ammonium bicarbonate.

90. A method comprising:
   a) providing a first mixture including a first oil phase comprising biomass-derived, carbon-containing compounds and a first aqueous phase comprising water; wherein the ratio of the specific gravities of the first oil phase to the first aqueous phase ($SGR^1$) is greater than 1.0;
   b) modifying the specific gravity of at least one of said first oil phase and said first aqueous phase, thereby resulting in a second mixture having a second oil phase and a second aqueous phase, wherein the ratio of the specific gravities of said second oil phase to said second aqueous phase ($SGR^2$) is less than 1.0; wherein a specific gravity modifier comprising light cycle oil is combined with said first oil phase of said first mixture, thereby forming said second mixture, wherein the ratio by volume of said light cycle oil to said first oil phase is in the range of from about 0.05:1 to about 1:1; and wherein the specific gravity of said second oil phase is lower than the specific gravity of said first oil phase; and
   c) separating at least a portion of said second oil phase from said second mixture.

91. The method of claim 90 wherein the ratio by volume of said light cycle oil to said first oil phase is in the range of from about 0.05:1 to about 0.2:1.

* * * * *

UNITED STATES PATENT AND TRADEMARK OFFICE
CERTIFICATE OF CORRECTION

| | | |
|---|---|---|
| PATENT NO. | : 9,315,739 B2 | Page 1 of 1 |
| APPLICATION NO. | : 13/212861 | |
| DATED | : April 19, 2016 | |
| INVENTOR(S) | : Ed Smith et al. | |

It is certified that error appears in the above-identified patent and that said Letters Patent is hereby corrected as shown below:

On the Title Page:
Under (75) Inventors: Delete "Lorerz" and replace with -- Lorenz --

Signed and Sealed this
Twenty-fourth Day of May, 2016

Michelle K. Lee
*Director of the United States Patent and Trademark Office*